United States Patent [19]
Wolpert et al.

[11] Patent Number: 5,381,308
[45] Date of Patent: Jan. 10, 1995

[54] ELECTRICAL COMPONENT ARRANGED FOR LOCKING AND ELECTRICALLY CONECTING IN AN OPENING OF A PANEL FROMEXTERNALLY OF THE PANEL

[76] Inventors: Richard W. Wolpert, 15 Elm St., Roslyn Heights, N.Y. 11577; Alan T. Wolpert, 8 Stanford Ct., Wantagh, N.Y. 11793; Richard A. Wolpert, 11 Ripley Dr., Northport, N.Y. 11768

[21] Appl. No.: 138,115

[22] Filed: Oct. 20, 1993

[51] Int. Cl.6 .................. H05K 7/02; H05K 3/30; F16B 21/00; H01R 9/00
[52] U.S. Cl. .................. 361/809; 29/835; 29/844; 29/882; 361/760; 361/776; 24/328; 439/95; 439/96; 439/97; 411/341; 411/344; 411/549

[58] Field of Search ............... 361/774, 809, 760–761, 361/769, 773, 776; 439/95, 96, 97; 24/335, 336, 337, 338, 328, 333; 411/341–347, 349, 549–553; 29/592.1, 842, 844, 835, 882

[56] References Cited

U.S. PATENT DOCUMENTS 3,488,628  1/1970  Lundergan et al. .................. 361/809
5,016,141  5/1991  Lorig et al. ......................... 361/809

*Primary Examiner*—Bot Ledynh
*Attorney, Agent, or Firm*—William A. Drucker

[57] ABSTRACT

A device and method for locking an electrical component, having a body and a flange portion, with a panel through a panel opening, in which the flange abuts a first face of the panel, which includes moving an actuator on the body of the component to displace a cam follower on the body from a first to a second position in which the cam follower projects beyond the contour of the body enough to abut another panel face.

5 Claims, 1 Drawing Sheet

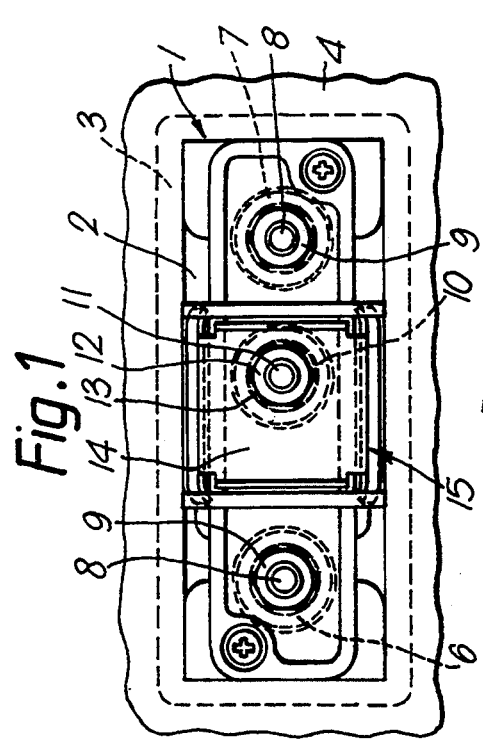
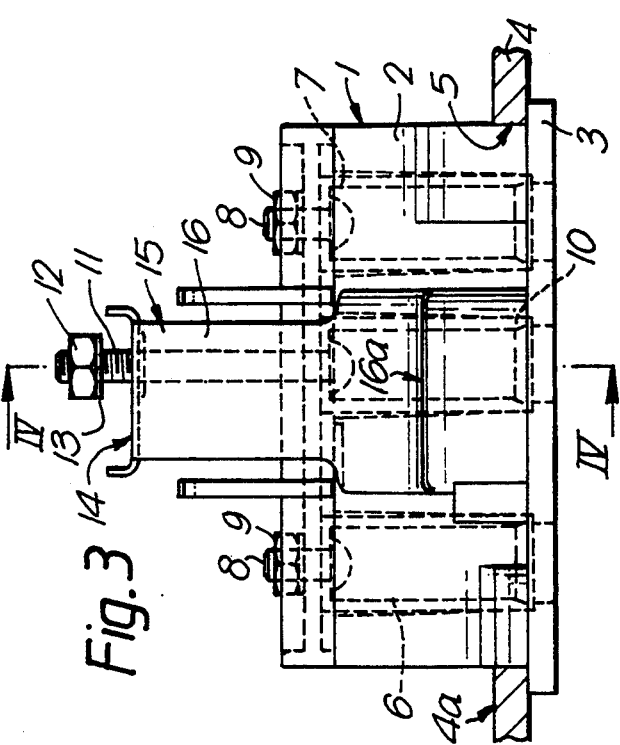
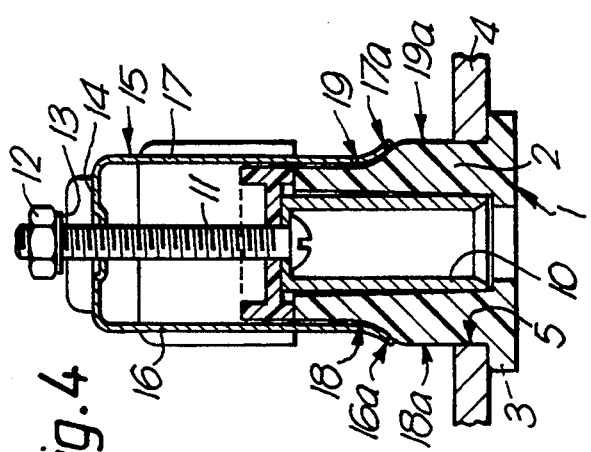
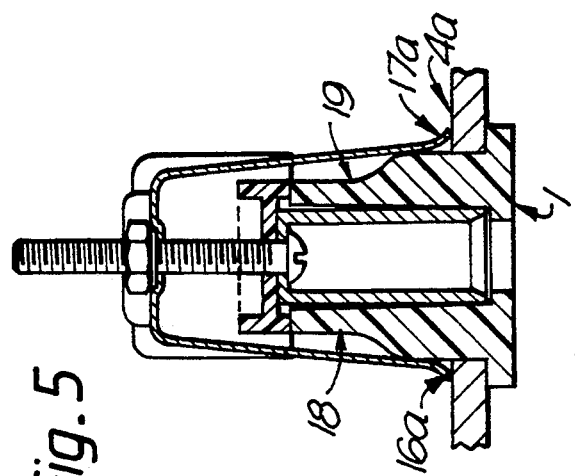

ELECTRICAL COMPONENT ARRANGED FOR LOCKING AND ELECTRICALLY CONECTING IN AN OPENING OF A PANEL FROMEXTERNALLY OF THE PANEL

SPECIFICATION

This invention relates to the art of mounting of an electrical component in a corresponding opening provided in a panel, and especially an electrically conducting panel.

OBJECTS OF THE INVENTION

A first object of the invention is to provide an improved electrical component having a body and a flange, and with which, for mounting of the component on a panel, the panel is provided with an opening to accommodate with clearance the body portion of the component and the flange is caused to abut a first surface of the panel, the component having an arrangement operable from the first surface of the panel, i.e. the front of the component, which in a rest state does not project beyond the contour of the body portion or at most not sufficiently to impede insertion of the body portion, but which arrangement when operated projects beyond the contour of the body portion sufficiently to abut the second surface of the panel and serves to lock the component in the opening.

A second object of the invention is to provide, in the component of the preceding paragraph, an arrangement which is electrically conductive and which is electrically connected to a terminal, such that, when the component is locked in position, an electrically conductive path is completed from the terminal to the panel.

SUMMARY OF THE INVENTION

According to the invention in a component including a body portion and a flange portion and intended for insertion through an opening of a panel having first and second surfaces bounding said opening, such that said flange portion abuts said first panel surface adjacent said opening, there are provided in combination:

(i) a cam means on said body portion,
(ii) cam follower means positioned on said body portion to co-act with said cam means,
(iii) actuator means carried by said body portion and coupled to said cam follower means for moving said cam follower means relative to said cam means in a direction towards said second surface of said panel, said cam means and said cam follower means being respectively shaped and dimensioned such that, in moving from a first position of said cam follower means more remote from said second panel surface to a second position of said cam follower means less remote from said second panel surface, said cam follower means is moved so as then to project from said body portion sufficiently to abut said second panel surface.

In a preferred form, when said component is engaged by said body portion through said opening of said panel, said actuator means is accessible for operation from said first surface of said panel.

For locking of the component in the opening, the cam follower means, when in said less remote second position, serves to clamp said panel between itself and said flange portion.

Advantageously said cam follower means and said actuator means are made electrically conductive, and said body portion includes a terminal connected to said actuator means and accessible from said first surface of said panel.

Further according to the invention, a method of locking an electrical component, having a body portion and a flange portion, in an opening of a panel through which said body portion is engaged with said flange abutting a first face of said panel, comprises operating, from a second face of said panel, an actuator on said body portion to move a cam follower means with respect to a cam means on said body portion from a first position to a second position in which said cam follower means is caused then to project beyond the contour of said body portion sufficiently to abut a second face of said panel.

BRIEF DESCRIPTION OF THE DRAWINGS

An embodiment of electrical component, and its method of operation, in accordance with the invention are hereinafter described with reference to the figures of the accompanying drawing.

In the drawings:

FIG. 1 is a rear elevation of the component, seen mounted in an opening in a panel;

FIG. 2 is a side elevation of the component, mounted in an opening in a panel, with a locking and/or earthing element in withdrawn position;

FIG. 3 is a plan view of the component, mounted in an opening of a panel seen in section;

FIG. 4 is a section taken on the line IV—IV of FIG. 3;

FIG. 5 is a section taken on the line IV—IV of FIG. 3, but with the locking and/or earthing element shown in a position of use applied against the panel.

DESCRIPTION OF THE PREFERRED EMBODIMENT

The electrical component denoted generally by the reference numeral 1 is shown as a female socket intended to receive a male plug, for example to constitute a power connector for a piece of electrical apparatus, but the invention is not restricted to such use and the component may be of any nature requiring to be mounted on a panel.

The socket 1 comprises an insulating body 2 of approximately parallelepipedal shape having at its front a peripheral flange 3.

The component is mounted to a panel 4, which may be electrically conductive, by being inserted through an opening 5 formed in the panel, and the shape of which opening corresponds to the external periphery of the body 2 of the component, with sufficient clearance (not shown in the drawing) to permit simple insertion and extraction of the component.

In the body 2 there are provided recesses to house cylindrical tubular sockets 6 and 7 aligned with openings in the front of the body 2 and intended to receive respective male pins of a power connector (not shown) used with the component, for example a neutral pin and a 'live' pin. The sockets 6 and 7 each have a threaded stem or bolt 8 and a nut 9 to permit fastening of a conductor.

Disposed between the sockets 6 and 7 is a further socket 10 intended to receive an 'earthing' male pin of the power connector. At its inner end, the socket 10 receives in freely rotatable clearance a bolt 11 carrying a nut 12 and a washer 13 which may serve to fasten an earth conductor. The bolt 11 is threadedly engaged through a threaded opening in a central portion 14 of a 'U-shaped' stirrup denoted generally by reference numeral 15 and including spaced legs 16 and 17. The stirrup as a whole is made of a resiliently deformable material and the legs 16 and 17 bear against respective cam surfaces 18 and 19 formed at opposed faces of the body 2.

In the position shown in FIGS. 2, 3 and 4, the central portion 14 is near the free end of the bolt 11, and the stirrup 15 is in a rest or non-operative position. In this position the respective tip portions 16a and 17a each abut a respective hollowed portion of the respective cam surface 18 or 19, so that the tip portions do not project outwardly beyond the adjacent respective zones 18a and 19a of the cam surfaces. With the stirrup in this position the component can accordingly be inserted into the opening 5 which, at least so far as concerns those parts which are adjacent to the zones 18a and 19a, is a close fit, e.g. with only a small clearance about the body 2 of the component. Once the component has been fully inserted into the opening 5, rotation clockwise of the bolt 11, by a screwdriver or other appropriate tool inserted into the socket 10, will cause the central portion 14 of the stirrup 15 to travel down the stem of the bolt and force the stirrup 15 downwardly such that the legs 16 and 17, starting from the position of FIGS. 2, 3 and 4, are caused to ride by their tip portions 16a, 17a along the respective cam surfaces 18, 19 such that the tips 16a, 17a eventually assume the more widely separated condition seen in FIG. 5. Full tightening of the bolt 11 in the portion 14 causes the tips 16a, 17a to be abutted firmly against the inner face 4a of the panel 4. According to the nature of the component, and the material of which the panel 4 is made (electrically conductive or not) the engagement illustrated in FIG. 5 can provide for either or both of (i) physical locking of the component in the opening 5 of the panel, and (ii) electrical connection, e.g. 'earthing' of the central socket 10 of the component to the panel.

Release of the locking and/or electrical connection can be obtained by rotating the bolt 11 anti-clockwise, to cause the portion 14 to ride towards the free end of the bolt, so that the stirrup 15 is caused to ride up until the tips 16a, 17a again lie against the less widely separated portions of the cam surfaces 18, 19, as seen in FIGS. 2 and 4, thus reducing the overall dimension to the same as, or less than, that of the zones 18a, 19a, permitting the component to be removed freely from the opening 5.

The invention provides the particular advantages of, inter alia:

(i) permitting the opening 5 to have a simple contour, e.g. rectangular and corresponding (with clearance only) to the external contour of the body 2 of the component;

(ii) permitting secure locking and/or electrical connection of the component to the panel, after insertion, by an operation which can be performed wholly from the front of the assembly of panel and component, i.e. not requiring access to the rear of the panel;

(iii) permitting release and/or electrical disconnection, of the component from the panel by an operation which can be performed wholly from the front of the panel, without requiring access to the rear of the panel.

It will be appreciated that the shape and respective dimensions of the opening of the panel, and of the body portion 2 of the component, need not correspond, provided only that (a) the flange 3 of the component may abut an area or areas of the panel bounding the opening, and (b) at least adjacent to the position of the tips 16a, 17a, the panel lies sufficiently close to the body 2 of the component to be abutted by the tips.

The stirrup could be replaced by a locking or electrically connecting member operative only at a single side of the body 2 of the component, or again such a member having more than two legs each co-operating with a respective cam surface.

I claim:

1. In a component including a body portion and a flange portion and intended for insertion through an opening of a panel having first and second surfaces bounding said opening, such that said flange portion abuts said first panel surface adjacent said opening, in combination:

(i) a cam means on said body portion;

(ii) cam follower means positioned on said body portion to co-act with said cam means;

(iii) actuator means carried by said body portion and coupled to said cam follower means for moving said cam follower means relative to said cam means in a direction towards said second surface of said panel, said cam means and said cam follower means being respectively shaped and dimensioned such that, in moving from a first position of said cam follower means more remote from said second panel surface to a second position of said cam follower means less remote from said second panel surface, said cam follower means is moved so as then to project from said body portion sufficiently to abut said second panel surface.

2. A component, as claimed in claim 1, wherein, when said component is engaged by said body portion through said opening of said panel, said actuator means is accessible for operation from said first surface of said panel.

3. A component, as claimed in claim 1, wherein said cam follower means when in said less remote second position serves to clamp said panel between itself and said flange portion, thereby to lock the component in said opening.

4. A component, as claimed in claim 1, wherein said cam follower means and said actuator means are electrically conductive, and wherein said body portion includes a terminal on said actuator means and accessible from said first surface of said panel.

5. A method of locking an electrical component, having a body portion and a flange portion, in an opening of a panel through which said body portion is engaged with said flange portion abutting a first face of said panel, which comprises steps of operating, from a second face of said panel, an actuator on said body portion to move a cam follower means with respect to a cam means on said body portion from a first position to a second position in which said cam follower means is caused then to project beyond the contour of said body portion sufficiently to abut said second face of said panel.

* * * * *